Patented May 29, 1951

2,555,068

UNITED STATES PATENT OFFICE 2,555,068

PROCESS FOR THE PREPARATION OF CYCLIZED RUBBER

Gerardus Johannes van Veersen, The Hague, Netherlands, assignor to Rubber-Stichting, Delft, Netherlands No Drawing. Application November 9, 1948, Serial No. 59,190. In the Netherlands December 31, 1947

8 Claims. (Cl. 260—769)

This invention relates to a process for the preparation of cyclized rubber by the cyclization of stabilized, aqueous dispersions of rubber.

The principal object of the present invention is to provide a method for the production of cyclized rubber from aqueous dispersions of rubber. Another object of the invention is to provide a process for the preparation of cyclized rubber which does not require the use of solvents during cyclization. A further object of this invention is to provide a procedure for the preparation of cyclized rubber from which aqueous dispersions of cyclized rubber may be obtained readily. Other objects of this invention include the provision of a rapid and economical process for the manufacture of cyclized rubbers and aqueous dispersions thereof.

It is well known that rubber, in the form of sheet, crepe or reclaimed rubber, can be converted into cyclized rubber by milling with sulfuric acid or a sulfonic acid (e. g. p-toluenesulfonic acid) and heating the mixture (e. g. 8 hours at 120° C.). Cyclization also has been obtained by similar treatment of rubber with aluminum chloride, compounds of boron and fluorine (e. g. $HBF_4$ and $H_2B_2O_4.6HF$), ferric chloride, stannic chloride, zinc chloride, acids and phenols, phosphorus pentachloride and acid salts (e. g. alum) or diazophenylboron tetrafluoride. The cyclized rubbers so produced are generally dark-colored and not very soluble in the usual rubber solvents.

Cyclized rubber has been prepared also by dissolving rubber in a solvent (e. g. benzene, toluene, xylene, mineral spirits, naphtha or white spirits) and heating the solution in the presence of cycling agents such as sulfuric acid, sulfonic acids, hydrogen fluoride, stannic chloride, boron trifluoride, aluminum chloride, zinc chloride, perchloric acid, acid anhydrides, acid chlorides, hydrogen chloride, orthophosphoric acid, orthoboric acid, trichloroacetic acid or phosphorus pentoxide and a phenol. The cyclized rubber so prepared is usually a light-colored powder which is soluble in most of the usual rubber solvents.

Bruson, in U. S. Patent No. 1,853,334, disclosed a process of preparing cyclized rubber by treating rubber with compounds of boron and fluorine. Although the description of the process is directed primarily to either milling a mixture of rubber and a cyclizing agent or treating a rubber solution with a cyclizing agent, the patentee mentions the treatment of rubber latex with the cyclizing agent. It is obvious, however, that the introduction of an acidic cyclizing agent into ordinary latex would cause immediate coagulation of the latex so that the rubber under treatment would be in the form of a coagulum rather than an aqueous dispersion during any cyclization.

In the operation of the process of the present invention, an aqueous dispersion of rubber is mixed with a non-ionic surface active agent to stabilize the dispersion in the presence of a cyclizing agent, which is usually acidic in character, a cyclizing agent is then added to the stabilized aqueous dispersion of rubber, and the resulting reaction mixture maintained at a reaction temperature for a period of time required for the desired degree of cyclization of the rubber. The cyclized rubber latex is then usually purified to obtain the cyclized rubber product.

My invention can be explained in greater detail by reference to the following specific examples which describe operating embodiments of my cyclizing process. The first of these examples illustrates the preparation of cyclized rubber from a stabilized, concentrated, (natural) rubber latex and concentrated sulfuric acid, showing particularly the relationship between the reaction time, the temperature attained and the extent of cyclization as indicated by the unsaturation of the intermediate and final cyclized rubber products.

Example 1

A 100 ml. portion of a 60% rubber latex was stabilized by intimately incorporating therewith 8 ml. of a 36% aqueous solution of a polyglycolether "Emulphor O". Thereafter, 75 ml. of concentrated sulfuric acid was added slowly to 100 ml. of the stabilized latex with the mixture being cooled during the addition of the acid. On terminating the cooling, the temperature of the reaction mixture increased to 94° C. The temperature of the reaction mixture was measured then at intervals and the unsaturation of the rubber under treatment determined, as shown in the following table:

| Time | Temperature | Unsaturation (Rubber=100%) |
|---|---|---|
| Minutes | ° C. | Per cent |
| 0 | 94 | -- |
| 2 | 98 | 86 |
| 5 | 98 | 82 |
| 10 | 111 | 47 |
| 13 | 122 | 36 |
| 16 | 120 | 24 |
| 19 | 113 | 20 |
| 30 | 94 | 20 |

The cyclized rubber latex then was treated with ethanol to coagulate the cyclized rubber and a solution of sodium carbonate was added to neutralize the sulfuric acid. The cyclized rubber was separated by filtration, washed and dried.

*Example 2*

This example illustrates the preparation of cyclized rubber from stabilized, rubber latex and gaseous hydrogen fluoride. A 60% rubber latex, stabilized with a polyglycolether "Emulphor O" as in the preceding example, was placed in a paraffin-lined absorber, saturated with hydrogen fluoride and thereafter the hydrogen fluoride was passed through the stabilized latex for three hours. On terminating the introduction of the hydrogen fluoride, methanol was added to the reaction mixture to coagulate the cyclized rubber, which then was separated by filtration and dried.

*Example 3*

This example illustrates the preparation of cyclized rubber from stabilized rubber latex and liquid hydrogen fluoride. A 20 ml. portion of a 60% rubber latex was stabilized by intimately incorporating therewith 250 mg. of a polyglycolether "Emulphor O" and 15 ml. of liquid hydrogen fluoride was added slowly to the mixture. After allowing the reaction mixture to stand for two hours, the cyclized rubber was precipitated with ethanol, separated, washed and dried. A determination of the unsaturation in the cyclized rubber product showed that 60% of the double bonds present in the original rubber latex had disappeared.

*Example 4*

This example illustrates the preparation of cyclized rubber from a stabilized, concentrated, rubber latex and boron trifluoride ($BF_3$). A 10 ml. portion of a 57% rubber latex was stabilized by incorporating therewith 150 mg. of a polyglycolether "Emulphor O" and 10 g. of gaseous boron trifluoride was introduced into the mixture. After allowing the reaction mixture to stand for two hours, the cyclized rubber was precipitated with ethanol, separated, washed and dried. A determination of the unsaturation in the cyclized rubber product showed that 80% of the double bonds present in the original rubber had disappeared.

*Example 5*

This example illustrates the production of cyclized rubber from a stabilized concentrated rubber latex and concentrated sulfuric acid. One hundred liters of a 60% rubber latex, stabilized with 2.5 kg. of a polyglycolether "Emulphor O", were delivered into a jacketed agitator constructed of acid resistant material and provided with means for alternately cooling and heating the contents thereof. One hundred twenty-six kilograms of concentrated sulfuric acid were added slowly to the agitated, stabilized, rubber latex and the mixture cooled during the addition of the acid so that the temperature of the mixture did not rise above 80° C. After all of the sulfuric acid was introduced, the reaction mixture was heated to 90° C. and this reaction temperature was maintained for two hours. The cyclized rubber was separated from the cyclized rubber latex, washed and dried.

The same procedure can be applied to the cyclization of latices prepared from all unsaturated synthetic rubbers which are capable of being cyclized. These rubbers include rubbers prepared by the polymerization of 1,3-butadiene alone or copolymerized with other polymerizable monomers, such as styrene, vinyl naphthalene, the alpha methylene carboxylic acids and their esters, the nitriles, such as acrylonitrile, amides of acrylic acid, methyl acrylate, methyl methacrylate, methacrylonitrile, methacrylamide, isobutylene, methyl vinyl ether and the like. Several artificial latices prepared from these synthetic unsaturated rubbers have appeared on the market having dry rubber contents within the range of from about 30 to 65%. The rubber in these products can be cyclized by my process. This process is applicable to all aqueous dispersions of unsaturated rubbers with the particles in some cases being flocculated or in the form of a wet coagulum.

It is evident that there are numerous factors which will influence conditions for the most satisfactory operation of the present invention, the actual limits of which cannot be established except by a detailed study of each set of starting materials and the intermediate and finished products involved.

The term "cyclized rubber" is understood to mean and include each cyclized product of the operation of this invention having the same ratio of carbon and hydrogen as the rubber from which it was prepared but with a decreased unsaturation as compared with such rubber.

The non-ionic stabilizing agent required in my process is one which is capable of rendering the latex acid-resistant or incapable of being coagulated at all acid concentrations, for example in the presence of concentrated sulfuric acid. Most cyclizing agents are acidic and hence during the cyclizing process the latex is usually subjected to the action of a strongly acid solution. The stabilizing agent is, of course, also subjected to the action of this acid and must be capable of withstanding its action without decomposing or losing its stabilizing effect. In some cases it may react with the acid to form another compound but the resulting reaction product must in that case also be a stabilizing agent. Thus, the stabilizing agent must be "acid-resistant" in the sense that its stabilizing action is not destroyed by acids. The term "acid-resistant" in the following description and in the claims is used with this meaning. The stabilizing agent must, of course, also be sufficiently soluble in water to produce the desired effect.

Many chemicals which are referred to as stabilizing agents and which are capable of stabilizing latex to some extent cannot be used in the present process. Examples of these are ammonia, casein, hemoglobin and other similar materials. While highly dilute latices stabilized with some of these agents can be made slightly acid without coagulation, none is capable of rendering latex incapable of coagulation at all acid concentrations, especially the more concentrated latices which are advantageously employed in the present invention.

A large number of stabilizing agents are known which are capable of rendering latex stable against coagulation at the addition of any given quantity of acid. Those skilled in the art know how to produce such stabilized latices.

The so-called non-ionic emulsifying or surface active agents are operative in my process. A non-ionic emulsifying agent can be defined as a substance having emulsifying properties as a result of the presence in the molecule of both hydroyphilic and hydrophobic groups, the molecule of which does not split into ions when dissolved in water.

The non-ionic emulsifying agents which are particularly suitable in the process of the present invention have the general formula:

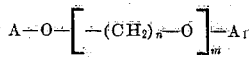

in which $n$ is either 2 or 3, $m$ is a whole number greater than 4, A is a member of the group consisting of the alkyl, alkylol, aryl and aralkyl radicals having more than 12 carbon atoms, and $A_1$ is a member of the group consisting of hydrogen and the alkyl, aryl and aralkyl radicals having more than 12 carbon atoms. Examples of suitable non-ionic emulsifying agents are the products obtained by polymerizing ethylene-oxide, and condensing the polyoxy ethylenic compounds with fatty acid derivatives having an active hydrogen-atom, as is more fully described in the Patent No. 1,970,578 to Schoeller c. s.

The products which are commercially available under the trade-names "Emulphor O"; "Vulcastab L W"; "Mulgofen O"; "Cémulsol T"; "Igepal W" and "Tween" are believed to be produced in accordance with the methods outlined in this patent, whereby as fatty acid derivatives are used: oleylalcohol, alkylphenol, or a partial ester of hexitol anhydride and long chain fatty acids.

My tests have shown that all non-ionic emulsifying agents which are water soluble and do not lose their emulsifying properties in strongly acid solution are operative in my process.

The above list of operative stabilizing agents could be extended considerably. But since the art is aware of methods of producing latices which are incapable of coagulation by the addition of any quantity of acid, it is not believed necessary to list additional stabilizing agents which are capable of producing these stabilized latices.

The concentration of the stabilizing agent in the latex is dependent on the type of stabilizing agent used, and ranges from a concentration as low as about 1.5% (calculated on the dry rubber content) in the case of the condensation derivative of a polyglycol ether with oleylalcohol known under the trade-name "Emulphor O" to more than 10%, (calculated on the dry rubber content) in the case of numerous other less suitable stabilizing agents. By reason of economy and of the undesirable properties which may be caused in the final product by the presence of a relatively large amount of stabilizing agent, I prefer to use those stabilizing agents which are capable of rendering the latex sufficiently stable when added in a small dose.

Satisfactory cycling agents for use in the present process include sulfuric acid, hydrogen fluoride and boron trifluoride. All water soluble cyclizing agents which function in an aqueous or acid medium are suitable for use in the present process. If the use of any particular cyclizing agent tends to produce the formation of rubber addition products, reaction conditions must be chosen to cause cyclization without addition reactions.

The introduction of an acidic cyclizing agent into a stabilized rubber latex first produces a certain acid concentration in the aqueous phase, depending upon the cyclizing agent, the concentration in which the cyclizing agent is used and the velocity of its introduction. Then, the cyclizing agent begins to react with the rubber globules in the latex, with the rate of reaction depending upon the pressure and temperature at which the reaction mixture is maintained. The factors of pressure, temperature and time may be maintained for any cycle of operation or changed at any time during the operation of the process to obtain the desired degree of cyclization.

The heat of reaction during cyclization may cause the temperature of the reaction mixture to rise well over 100° C. as shown above in the first example. The reaction mixture should be agitated adequately to maintain a uniform temperature throughout, with adequate cooling of the mixture to prevent the temperature from rising over 140° C., otherwise carbonization in the mixture may occur. The reaction time may vary from 30 minutes to 10 hours depending upon the starting materials, the reaction conditions and the degree of cyclization required. An extended cyclization at higher temperature may cause the cyclized rubber to be precipitated in a finely divided condition.

The form in which the cyclized rubber is present in the dispersion is determined by the extent of agglomeration of the cyclized rubber particles. If any substantial agglomeration occurs, the agglomerates formed may be dispersed readily. The cyclized rubber latex produced in this process contains cyclized rubber particles which are usually dispersed in the same manner as the rubber particles in rubber latex. The cyclized rubber dispersion cannot be distinguished microscopically from the original rubber latex. Consequently, the purification methods applicable to the treatment of rubber latex are applicable for the treatment of cyclized emulsions.

Solid cyclized rubber can be recovered from the dispersion of cyclized rubber by precipitation, flocculation and/or sedimentation, combined, if desired, with centrifuging or other methods of treatment. The separation of solid cyclized rubber may be effected by the addition to the dispersion of a precipitant which may be an organic non-solvent, such as alcohol or toluene or in some instances, water. In contradistinction to most commercial cyclized rubber, the solid cyclized rubber recovered in this process is in a finely divided powder form.

The precipitated and purified solid cyclized rubber may be dried and used directly in powder form or the aqueous dispersion of cyclized rubber recovered in my process can be purified by any of the conventional methods used for purifying latex and then used as a cyclized rubber latex for industrial applications.

In order to modify the properties of the cyclized rubber latex and the cyclized rubber to be recovered therefrom, softeners (e. g. phthalate), plasticizers, stabilizers, active or inert fillers, vulcanization ingredients, pigments and the like can be added to the original rubber latex, the cyclized rubber dispersion or the solid cyclized rubber.

The cyclized rubber may be vulcanized with materials, such as sulfur, sulfides, $S_2Cl_2$, $KSO_3Cl$ and $SO_2Cl_2$. The cyclized rubber in the aqueous dispersion may be vulcanized before its separation therefrom by the use of vulcanizers which are not affected adversely by the acidity of the dispersion.

The cyclized rubber product is suitable as an adhesive and as an insulating material. The addition of cyclized rubber to synthetic or natural rubber can improve various properties of the vulcanizates. Cyclized rubber can be used also as a substitute for gutta-percha in the manufacture of golf balls. Cyclized rubber may be used in the manufacture of water-proof paper. Cyclized rubber can be used also in the manufacture of paints and lacquers, since a solution of cyclized rubber may be evaporated to give a glossy film which hardens on exposure to air.

While it is possible to conduct my cyclizing process with diluted latices, it is more advantageous to employ latices having a concentration of at least 25 per cent rubber content. This is more economical in that there is a saving in cyclizing agent as well as stabilizing agent. When a rubber flocculate is used the dry rubber content of the aqueous dispersion may range up to about 80 per cent by weight.

What I claim is:

1. In the manufacture of cyclized rubber, the process which comprises adding to a concentrated natural rubber latex a condensation product of a polyglycol ether with oleylalcohol to render the latex non-coagulable by the addition of any quantity of acid, adding concentrated sulfuric acid in amount sufficient to act as a cyclizing agent, heating to produce cyclization but holding the temperature below about 140° C. to prevent carbonization until the rubber is substantially cyclized, whereby an aqueous dispersion of cyclized rubber is obtained, and recovering the resulting finely-divided cyclized rubber.

2. In the manufacture of cyclized rubber, the process which comprises stabilizing a latex of an unsaturated rubber capable of being cyclized and selected from a class consisting of natural rubber, and synthetic rubbers consisting of polymers and copolymers of conjugate diolefin hydrocarbons by mixing therewith a non-ionic stabilizing agent which does not lose its stabilizing properties in the presence of strong sulfuric acid and having the general formula $$A\text{—}C\text{—}(\text{—}(CH_2)_n\text{—}O)_m\text{—}A^1$$

wherein $n$ is a numeral within the range of 2 to 3, $m$ is a whole number greater than 4, A is a substituent selected from the group consisting of alkyl, alkylol, aryl and aralkyl radicals having more than 12 carbon atoms, and $A^1$ is a substituent selected from the group consisting of alkyl, aryl and aralkyl radicals having more than 12 carbon atoms, the quantity of stabilizing agent added being sufficient to stabilize the latex in the presence of concentrated sulfuric acid, then adding an acid cyclizing agent in quantity sufficient to produce cyclization of said latex and heating the resulting mixture to reaction temperatures not exceeding 140° C. until cyclization is produced, whereby an aqueous dispersion of cyclized rubber is obtained.

3. The process of claim 2 wherein the cyclizing agent is concentrated sulfuric acid.

4. The process of claim 2 wherein said surface active agent is a polyglycol ether.

5. The process of claim 2 followed by precipitating the cyclized rubber from the dispersion and removing residual cyclizing agent.

6. The process of claim 2 followed by separation of the residual cyclizing agent, washing and recovery of the cyclized rubber in the form of an aqueous dispersion.

7. The process of claim 2 wherein said rubber latex has a dry rubber content ranging from about 25 to 80 per cent by weight.

8. In the manufacture of cyclized rubber, the process which comprises adding to a natural rubber latex having a dry rubber content of from about 25 to 80 per cent by weight from about 0.15 to 10 per cent of a non-ionic stabilizing agent which does not lose its stabilizing properties in the presence of strong sulfuric acid and having the general formula $$A\text{—}O\text{—}(\text{—}(CH_2)_n\text{—}O)_m\text{—}A^1$$

wherein $n$ is a numeral within the range of 2 to 3, $m$ is a whole number greater than 4, A is a substituent selected from the group consisting of alkyl, alkylol, aryl and aralkyl radicals having more than 12 carbon atoms, and $A^1$ is a substituent selected from the group consisting of alkyl, aryl and aralkyl radicals having more than 12 carbon atoms, the quantity of stabilizing agent added being sufficient to stabilize the latex in the presence of concentrated sulfuric acid, adding concentrated sulfuric acid in quantity sufficient to act as a cyclizing agent, heating the resulting mixture to reaction temperatures not exceeding 140° C. until substantial cyclization of the rubber is produced and recovering the resulting cyclized rubber.

GERARDUS JOHANNES van VEERSEN.

REFERENCES CITED

The following references are of record in the file of this patent:

UNITED STATES PATENTS

| Number | Name | Date |
|---|---|---|
| 1,699,369 | McGavack et al. | Jan. 15, 1929 |
| 1,853,334 | Bruson | Apr. 12, 1932 |
| 2,038,709 | Billings | Apr. 28, 1936 |
| 2,046,015 | Bunbury et al. | June 30, 1936 |
| 2,265,324 | Spence | Dec. 9, 1941 |
| 2,442,341 | Buffington | June 1, 1948 |

FOREIGN PATENTS

| Number | Country | Date |
|---|---|---|
| 476,269 | Great Britain | Dec. 6, 1937 |